(12) United States Patent
Kunimune et al.

(10) Patent No.: US 11,162,004 B2
(45) Date of Patent: Nov. 2, 2021

(54) ELECTRICALLY CONDUCTIVE ADHESIVE AND ELECTRICALLY CONDUCTIVE MATERIAL

(71) Applicant: Nichia Corporation, Anan (JP)

(72) Inventors: Teppei Kunimune, Tokushima (JP); Masafumi Kuramoto, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 15/711,284

(22) Filed: Sep. 21, 2017

(65) Prior Publication Data
US 2018/0086950 A1 Mar. 29, 2018

(30) Foreign Application Priority Data
Sep. 23, 2016 (JP) .............................. JP2016-186115

(51) Int. Cl.
C09J 9/02 (2006.01)
C08K 3/08 (2006.01)
C09J 171/02 (2006.01)

(52) U.S. Cl.
CPC .................. C09J 9/02 (2013.01); C08K 3/08 (2013.01); C09J 171/02 (2013.01); C08K 2003/0806 (2013.01); C09J 2471/00 (2013.01); C09J 2483/00 (2013.01)

(58) Field of Classification Search
CPC .............. C09J 9/02; C09J 171/02; C08K 3/08
See application file for complete search history.

(56) References Cited

U.S. PATENT DOCUMENTS

| | | | |
|---|---|---|---|
| 5,173,765 A | 12/1992 | Nakayoshi et al. | |
| 2005/0165169 A1* | 7/2005 | Levey ..................... | C08L 13/00 525/192 |
| 2009/0186219 A1 | 7/2009 | Inaba | |
| 2010/0099790 A1 | 4/2010 | Manabe et al. | |
| 2012/0292558 A1 | 11/2012 | Kodama et al. | |
| 2013/0082369 A1 | 4/2013 | Kokubo et al. | |
| 2013/0165611 A1 | 6/2013 | Manabe et al. | |
| 2014/0004341 A1 | 1/2014 | Moroishi et al. | |
| 2015/0188008 A1 | 7/2015 | Kokubo et al. | |
| 2015/0218318 A1 | 8/2015 | Manabe et al. | |
| 2015/0218319 A1 | 8/2015 | Manabe et al. | |
| 2015/0361320 A1 | 12/2015 | Tang et al. | |
| 2016/0326406 A1 | 11/2016 | Moroishi et al. | |
| 2017/0121462 A1 | 5/2017 | Fujisawa et al. | |

FOREIGN PATENT DOCUMENTS

| | | |
|---|---|---|
| JP | 62-42952 A | 2/1987 |
| JP | 63-89559 A | 4/1988 |
| JP | 1-294784 A | 11/1989 |
| JP | 3-170581 A | 7/1991 |
| JP | 5-81923 A | 4/1993 |
| JP | 9-328671 A | 12/1997 |
| JP | 10-17780 A | 1/1998 |
| JP | 11-236545 A | 8/1999 |
| JP | 2000-256642 A | 9/2000 |
| JP | 2002-363429 A | 12/2002 |
| JP | 2006-225460 A | 8/2006 |
| JP | 2007-204561 A | 8/2007 |
| JP | 2007-234842 A | 9/2007 |
| JP | 2009-13449 A | 1/2009 |
| JP | 2009-19139 A | 1/2009 |
| JP | 2009-108162 A | 5/2009 |
| JP | 2009-209246 A | 9/2009 |
| JP | 2010-53331 A | 3/2010 |
| JP | 2011-37981 A | 2/2011 |
| JP | 2011-52043 A | 3/2011 |
| JP | 2011-57862 A | 3/2011 |
| JP | 2011-510139 A | 3/2011 |
| JP | 2011-71057 A | 4/2011 |
| JP | 2011-153252 A | 8/2011 |
| JP | 2013-79329 A | 5/2013 |
| JP | 2013-234333 A | 11/2013 |
| JP | 2014-24958 A | 2/2014 |
| JP | 2014-40536 A | 3/2014 |
| JP | 2014-133822 A | 7/2014 |
| JP | 2014-185227 A | 10/2014 |
| JP | 2015-71796 A | 4/2015 |
| JP | 2015-110759 A | 6/2015 |
| JP | 2015-129288 A | 7/2015 |
| JP | 2016-3306 A | 1/2016 |
| JP | 2016-510358 A | 4/2016 |
| JP | 2016-148104 A | 8/2016 |
| WO | WO 2009/092064 A2 | 7/2009 |
| WO | WO 2011/125753 A1 | 10/2011 |
| WO | WO 2012/086588 A1 | 6/2012 |
| WO | WO 2012/124670 A1 | 9/2012 |
| WO | WO 2012/164836 A1 | 12/2012 |
| WO | WO 2013/051600 A1 | 4/2013 |

(Continued)

OTHER PUBLICATIONS

"Printing and Packaging Functional Materials", First Edition, p. 101, China Light Industry Press, with a machine English Translation.

"Study on the Preparation and Properties of High Performance Electrical Conductive Adhesives for LED Packaging", Third Term, Chinese Doctoral Dissertations Full-Text-Database—Information Science and Technology, 1135-77, with a machine English Translation.

(Continued)

*Primary Examiner* — John E Uselding

(74) *Attorney, Agent, or Firm* — Birch, Stewart, Kolasch & Birch, LLP

(57) ABSTRACT

Disclosed is an electrically conductive adhesive containing: (A) a polyether polymer having a backbone comprising a repeating unit of the formula: —$R^1$—O— wherein $R^1$ is a hydrocarbon group having 1 to 10 carbon atoms, and an end group which is a hydrolyzable silyl group, and (B) silver particles. Further disclosed is an electrically conductive material which is a hardened product of the electrically conductive adhesive.

18 Claims, No Drawings

(56) References Cited

FOREIGN PATENT DOCUMENTS

WO  WO 2015/060173 A1  4/2015
WO  WO 2015/155950 A1  10/2015

OTHER PUBLICATIONS

Chen et al., "New progress in energy-saving lighting sources," 1st Edition, Anhui Science and Technology Press, Jan. 31, 2016, p. 342 (4 pages total), with English abstract.

* cited by examiner

ELECTRICALLY CONDUCTIVE ADHESIVE AND ELECTRICALLY CONDUCTIVE MATERIAL

CROSS-REFERENCE TO RELATED APPLICATION

This application claims priority to Japanese Patent Application No. 2016-186115 filed on Sep. 23, 2016, the entire disclosure of which is hereby incorporated by reference.

BACKGROUND

Technical Field

The present disclosure is related to an electrically conductive adhesive, a method of producing the electrically conductive adhesive, an electrically conductive material and a method of producing the electrically conductive material.

Description of Related Art

An electrically conductive adhesive is mainly used as an electrical conducting material which connects an electronic part to a conductor of a printed circuit board. The electrically conductive adhesive comprises binders such as an epoxy resin, a silicone resin, a polyimide resin and a polyurethane resin, and electrically conductive fillers such as silver, nickel and carbon. The electrically conductive adhesive is mainly used in a secondary mounting on a printed wiring board of IC and LSI and an oscillator (rock crystal, ceramics), in order to electrically connect the part. Conductive adhesives are mainly used in secondary mounting of IC and LSI on printed wiring boards, and vibrators (for example, quartz and ceramics) in order to electrically join the part. In the binder, the silicone resin is inferior to the epoxy resin in view of adhesion and price, the polyimide resin is inferior to the epoxy resin in view of flexibility and price, the polyurethane resin is inferior to the epoxy resin in view of heat resistance, so that the epoxy adhesive is mainly used.

Flexible devices such as a wearable device recently attract attention. Until now, a level of slightly bending is sufficient, but, in future the devices will be required to have a flexibility level of folding. In a wiring material used for the device, a metal wiring is not easily expanded and shrunk so that the metal wiring may be disconnected by bending. In the electrically conductive adhesive, the epoxy resin mainly used until now is inflexible and is not suitable. The polyimide resin is also not suitable, and the polyurethane resin has a low thermal resistance. Accordingly, the silicone-based electrically conductive adhesive is expected. However, the electrically conductive adhesives such as the silicone-based electrically conductive adhesive are inferior in electrical conductivity in comparison with the metal, to give a large loss of electric power.

JP 2002-363429A discloses a thermally conductive composition which comprises a thermally conductive filler, and a polyisobutylene, polyether or acrylic copolymer having hydrolyzable silyl groups at chain both ends of molecular chain. Aluminum oxide is used as the thermally conductive filler.

JP 2011-510139A discloses an electrically conductive adhesive comprising an electrically conductive powder, a thermosetting silicone resin and a solvent. A silicone resin is used as a binder.

SUMMARY

An embodiment of the present invention provides an electrically conductive adhesive having high electrical conductivity while having good flexibility, a method of producing the electrically conductive adhesive, an electrically conductive material formed from the electrically conductive adhesive, and a method of producing the electrically conductive material by using the electrically conductive adhesive.

Another embodiment of the present invention relates to an electrically conductive adhesive comprising (A) a polyether polymer and (B) silver particles.

A further embodiment of the present invention relates to a method of producing an electrically conductive material comprising a step of calcinating the electrically conductive adhesive.

DETAILED DESCRIPTION

Hereinafter, the electrically conductive adhesive, the method of producing the electrically conductive adhesive, and the electrically conductive material, and the method of producing the electrically conductive material are explained.

Electrically Conductive Adhesive

In an embodiment of the present invention, the electrically conductive adhesive comprises (A) a polyether polymer and (B) silver particles.

This embodiment of the present invention provides the electrically conductive adhesive having high electrical conductivity with having good flexibility. This electrically conductive adhesive has two characteristics that oxygen permeability is high and that a decomposition caused by oxygen easily occurs at the time of heating. The surface activation of the silver particles by oxygen and the increase in the contact points between the silver particles at the time of heating are generated so that the silver particles easily sinter at a low temperature.

The electrically conductive adhesive may further comprise at least one selected from:
(C) a condensation catalyst,
(D) an antioxidant, and
(E) another component.

In the electrically conductive adhesive, the polyether polymer (A) constitutes a resin material. The resin material comprises or consists of the polyether polymer (A). The amount of the polyether polymer (A) in the resin material may be 30% to 100% by weight, preferably 70% to 100% by weight, especially 100% by weight, based on the resin material. The resin material may contain another resin other than the polyether polymer (A). Examples of the other resin include an epoxy resin, a silicone resin, a polyimide resin and a polyurethane resin. The amount of the other resin may be 70 parts by weight or less, preferably 30 parts by weight or less, particularly 10 parts by weight or less, based on 100 parts by weight of the polyether polymer (A). Preferably, the resin material does not substantially contain an epoxy resin, which means that the amount of the epoxy resin is 3 parts by weight or less, preferably 1 part by weight or less, particularly 0 part by weight, based on the polyether polymer (A). The resin material preferably consists of the polyether polymer (A).

(A) Polyether Polymer

The polyether polymer has a backbone (or a main chain) comprising a repeating unit of the formula:

wherein $R^1$ is a hydrocarbon group having 1 to 10 carbon atoms, and an end group which is a hydrolyzable silyl group, The backbone of the polyether polymer has the repeating unit of the formula:

wherein $R^1$ is a hydrocarbon group having 1 to 10 carbon atoms.

The $R^1$ group is a divalent hydrocarbon group having 1 to 10 carbon atoms. The number of carbon atoms in the $R^1$ group may be 1 to 6, for example, 1 to 4, particularly 2 or 3, especially 3. The $R^1$ group may have an oxygen atom or a sulfur atom, for example, may be interrupted by the oxygen atom or the sulfur atom. Examples of the $R^1$ group include an aliphatic group, an aromatic group and an aralipatic group. The $R^1$ group is preferably an alkylene group. Specific examples of the $R^1$ group include $-CH_2-$, $-CH_2CH_2-$, $-CH(CH_3)-CH_2-$, $-CH_2CH_2CH_2CH_2-$, $-CH(C_2H_5)-CH_2-$ and $-C(CH_3)_2-CH_2-$. Preferable is $-CH(CH_3)-CH_2-$. The $R^1$ group may one alone (for example, an isopropylene group alone), or a combination of at least two (for example, a combination of an isopropylene group and an ethylene group).

The backbone of the polyether polymer may consist of the repeating unit of $-R^1-O-$, but the backbone may have another repeating unit. Examples of the other repeating unit include a siloxane group, an amide group, an imido group, an ethylene group and an ethylidene group.

The amount of the repeating unit of $-R^1-O-$ in the backbone may be at least 40% by weight, for example, 50% to 100% by weight, particularly 70% to 100% by weight, especially 100% by weight, based on the backbone. Alternatively, in the presence of the other repeating unit, the amount of the repeating unit of $-R^1-O-$ may be 30% to 90% by weight, for example, 50% to 80% by weight, based on the backbone.

The polyether polymer has the end group which is a hydrolyzable silyl group. The hydrolyzable silyl group is preferably of the formula:

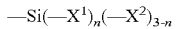

wherein $X^1$ is a hydrolyzable group,
$X^2$ is a hydrocarbon group having 1 to 12 carbon atoms, and
n is 1, 2 or 3.

Preferably, the hydrolyzable group (that is, the $X^1$ group) is at least one group selected from a hydride group, an alkoxy group (for example, having 1 to 4 carbon atoms), a halogen group, an acyloxy group, a ketoxymate group, an aminoxy group, an amide group, an amino group and an mercapto group. Specific examples of the hydrolyzable group include a chlorine atom, a methoxy group and an ethoxy group.

$X^2$ is a hydrocarbon group having 1 to 12 carbon atoms. Preferably, $X^2$ is an alkyl group. Preferably, the carbon number of $X^2$ is from 1 to 4. Specific examples of $X^2$ include a methyl group, an ethyl group and an isopropyl group.

The end groups of the polyether polymer may consist of an end group which is a hydrolyzable silyl group, but the end groups may be another end group. Examples of other end group include a hydrogen atom, a hydroxyl group, an alkyl group (for example, having 1 to 6 carbon atoms) (such as a methyl group and an ethyl group), an alkoxy group (for example, having 1 to 6 carbon atoms) (such as a methoxy group and an ethoxy group), an allyl group and an allyloxy group. The amount of the hydrolyzable silyl group in the end groups may be at least 30%, for example, 40 to 100%, particularly 40 to 75%, based on the number of all end groups.

The hydrolyzable silyl group may be present in the middle of the backbone (as a pendent group), but is preferably present only at the end of the polymer.

An average molecular weight of the polyether polymer may be 300 to 100,000, for example, 400 to 20,000. The average molecular weight is a weight-average molecular weight measured by gel permeation chromatography (GPC) in terms of standard polystyrene.

The amount of the polyether polymer may be 1 to 30 parts by weight, for example, 2 to 25 parts by weight, particularly 5 to 20 parts by weight, especially 7 to 18 parts by weight, based on 100 parts by weight of the silver particles (B).

The polyether polymer is usually a liquid. The polyether polymer is hardened to be a non-fluid (solid).

(B) Silver Particles

The electrically conductive adhesive comprises the silver particles. Preferably, the silver particles are prepared by a wet reduction method, since the silver particles easily sinter at a low temperature.

Other metal particles may be used in addition to the silver particles. Examples of other metal particles other than the silver (Ag) particles include particles of at least one metal selected from gold (Au), copper (Cu), platinum (Pt), palladium (Pd), rhodium (Rh), ruthenium (Ru), iridium (Ir) and osmium (Os). Gold, platinum and palladium are preferred. Herein, particles including the silver particles and the other metal particles are referred to as "metal particles." Silver is preferably a principal component (for example, at least 70% by weight) in the metal particles. The metal particles containing silver as the principal component are easily sintered in the presence of oxygen. The metal particles may be a combination of silver and the other metal (for example, alloy, or separate particles consisting of one metal selected from silver or the other metal), but the metal particles preferably consist of silver. The amount of the silver particles in the metal particles is, for example, at least 70% by weight (specifically 70% to 100% by weight), preferably at least 80% by weight, more preferably 90% by weight, particularly 100% by weight, based on the metal particles. The amount of the other metal particles in the metal particles may be, for example, 30% to 0% by weight, preferably 20% to 0% by weight, more preferably 10 to 0% by weight, particularly 0% by weight, based on the metal particles.

The metal particles including the silver particles (and preferably the other metal particles) may have an average particle diameter of 0.1 micrometers to 15 micrometers, preferably 0.3 micrometers to 10 micrometers, more preferably 0.3 micrometers to 5 micrometers. The silver particles may have an average particle diameter of 0.3 micrometers to 5 micrometers, preferably 1.0 micrometers to 4 micrometers, more preferably 1.5 micrometers to 3.5 micrometers. The metal particles (particularly silver particles) may have one average particle diameter, or metal particles (particularly silver particles) having at least two average particle diameters may be mixed and used. By using the predetermined average particle diameter, the silver particles (and the other metal particles) can be located in high density to give a small electric resistance value.

The metal particles have so particle sizes that the content of the particles having at most 0.3 micrometers is preferably 5% by weight or less, more preferably 4% by weight or less. The metal particles have so particle sizes that the content of the particles having at most 0.5 micrometers is preferably 15% by weight or less, more preferably 10% by weight or less.

The average particle diameter of metal particles can be measured by a laser diffraction. The "average particle diameter" means a value of particle diameter at which a cumulative volume frequency determined from particle size distribution is 50%. Herein, the average particle diameter means a median diameter, unless specified otherwise.

The metal particles may have a specific surface area of 0.4 $m^2/g$ to 1.5 $m^2/g$, preferably 0.6 $m^2/g$ to 0.9 $m^2/g$, more preferably 0.66 $m^2/g$ to 0.74 $m^2/g$. The larger the specific surface area is, the smaller the electric resistance can be by enlarging a contact area of the adjacent metal particles (particularly silver particles). If, however, the specific surface area is too large, the viscosity increase caused by the addition of the metal particles (particularly the silver particles) is so large that the amount of the metal particles which can be contained in the electrically conductive adhesive is decreased to give a high electric resistance. The low electric resistance is obtained by using the metal particles having the predetermined specific surface area. The specific surface area of the metal particles which are the main raw materials of the electrically conductive adhesive can be measured by a BET method.

The shape of the metal particles is not limited. The shape of the metal particles may be, for example, a spherical shape, a flat shape, a flake shape or a polyhedral shape. The flake shape is preferable. The flake shape gives a low electrical resistance by increasing a contact area between adjacent metal particles. The shape of the metal particles is preferably uniform for metal particles having the predetermined average particle diameter range. When the metal particles having at least two different average particle diameter values are mixed, the shape of the metal particles having one average particle diameter may be the same or different from the shape of the other metal particles having the other average particle diameter. For example, when mixing two types of the metal particles in which one type has an average particle diameter of 3 micrometers and the other type has an average particle diameter is 0.3 micrometers, the metal particles having an average particle diameter of 0.3 micrometers may have a spherical shape, and the metal particles having an average particle diameter of 3 micrometers may have a flat shape.

The content of the metal particles (especially, the content of the silver particles) is preferably 70% to 99% by weight, more preferably 75 to 98% by weight, particularly 80 to 95% by weight, based on the electrically conductive adhesive. When the content of the metal particles is in the predetermined range, the electrical conductivity of the obtained electrically conductive material is high.

The electrically conductive adhesive may comprises, if necessary, in addition to the above-mentioned components,
(C) a condensation catalyst,
(D) an antioxidant, and
(E) another additive such as an organic solvent, a silane coupling agent, a plasticizer and an ultraviolet ray absorbent.

(C) Condensation Catalyst

The condensation catalyst may be, for example, a silanol condensation catalyst. The silanol condensation catalyst is not particularly limited, as long as the silanol condensation catalyst is a compound which can be applied to a condensation reaction between a silanol group and a group condensable with the silanol group. For example, conventionally known compounds can be used. The silanol condensation catalyst is preferably at least one catalyst selected from a tin compound, a zinc compound and a zirconium compound, from the viewpoint that exhibition of higher hardness, excellent hardenability (Specifically, high hardness is exhibited for a short time, and a temporal change of hardness is small.), excellent thermal stability, excellent workability, high transparency and low viscosity. The silanol condensation catalyst is preferably one or both of the tin compound and the zinc compound.

The tin compound is not be particularly limited as long as the tin compound is a compound containing tin. From the viewpoint that higher hardness can be exhibited, hardenability, thermal stability and workability are excellent, transparency is high, and viscosity is low, the tin compound is preferably a tetravalent tin compound, more preferably a tetravalent tin compound having an ester bond-containing group and an alkyl group.

Examples of the tin compound include a compound of the formula:

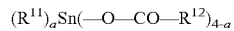

$$(R^{11})_a Sn(-O-CO-R^{12})_{4-a}$$

wherein $R^{11}$ is an alkyl group having 1 to 30 carbon atoms, $R^{12}$ is a hydrocarbon group having 1 to 30 carbon atoms, and a is an integer of 1 to 3.

Preferably, the number of carbon atoms of $R^{11}$ is 1 to 20, for example, 1 to 10. Specific examples of $R^{11}$ include a methyl group, an ethyl group, a propyl group, a butyl group, a pentyl group and an octyl group.

The number of carbon atoms of $R^{12}$ may be 1 to 20. $R^{12}$ may be an aliphatic hydrocarbon group, an alicyclic hydrocarbon group, an aromatic hydrocarbon groups or a combination of thereof. The hydrocarbon group may be linear, branched, cyclic or a combination of thereof. The hydrocarbon group may have an unsaturated bond. The hydrocarbon group may have a hetero atom such as an oxygen atom, a nitrogen atom and a sulfur atom.

Specific examples of the tin compound include dialkyl tin compounds such as dibutyltin diacetate, dibutyltin dioleate, dibutyltin dioctoate, dibutyltin dilaurate, dioctyltin diacetate, dioctyltin maleate and dibutyltin phthalate; dialkyltin dimers such as dibutyltin oxyacetate dibutyltin oxyoctylate, dibutyltin oxylaurate dibutyltin bismethylmaleate and dibutyltin oxyoleate; dibutyltin maleate polymers and dioctyltin maleate polymers; and monobutyltin tris(2-ethylhexanoate).

The tin compound is preferably dibutyltin diacetate, dibutyltin dioleate, dibutyltin dilaurate and dibutyltin dioctoate from the viewpoint of higher hardness, more excellent hardenability and higher transparency.

The zinc compound is not limited as long as the zinc compound is a compound containing zinc. Examples of the zinc compound include carboxylate salts, for example, zinc aliphatic carboxylates such as zinc acetate, zinc acetyl acetate, zinc 2-ethylhexanoate, zinc octylate, zinc neodecanoate, zinc laurate and zinc stearate, zinc cycloaliphatic carboxylates such as zinc naphthenate, and zinc aromatic carboxylates such as zinc benzoate, zinc p-tert-butyl-benzoate and zinc salicylate; zinc (meth)acrylates; and zinc chelates such as zinc acetylacetonate [Zinc(II) acetylacetonate and $Zn(acac)_2$] and zinc 2,2,6,6-tetramethyl-3,5-heptanedionate. Among them, zinc 2-ethylhexanoate and zinc naphthenate are preferable from the viewpoint of higher hardness, more excellent hardenability and higher transparency.

The zirconium compound is not limited as long as the zirconium compound is a compound containing a zirconium atom. Examples of the zirconium compound include a zirconyl compound and an organo-oxy-zirconium compound.

Examples of the zirconyl compound include a compound of the formula:

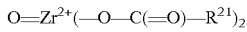

$$O=Zr^{2+}(-O-C(=O)-R^{21})_2$$

wherein $R^{21}$ is a hydrocarbon group having 1 to 18 carbon atoms.

Specific examples of the zirconyl compound include aliphatic carboxylate salts such as zirconyl dioctylate and zirconyl dineodecanoate; cycloaliphatic carboxylate salts such as zirconyl naphthenate and zirconyl cyclohexanoate; and aromatic carboxylate salts such as zirconyl benzoate.

Examples of the organo-oxy-zirconium compound include a compound of the formula:

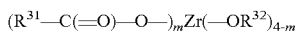

$$(R^{31}-C(=O)-O-)_m Zr(-OR^{32})_{4-m}$$

wherein $R^{31}$ is, the same or different, a hydrocarbon group having 1 to 16 carbon atoms,
$R^{32}$ is, the same or different, a hydrocarbon group having 1 to 18 carbon atoms, and
m is an integer of 1 to 3.

Each of $R^{31}$ and each of $R^{32}$ may be the same or different.

Examples of the hydrocarbon group denoted by $R^{31}$ include an aliphatic hydrocarbon group, an alicyclic hydrocarbon group, an aromatic hydrocarbon groups and a combination of thereof. The hydrocarbon group may be linear or branched. The hydrocarbon group may have an unsaturated bond. The hydrocarbon group may have a hetero atom such as an oxygen atom, a nitrogen atom and a sulfur atom.

Preferably, the hydrocarbon group denoted by $R^{31}$ has a cyclic structure from the viewpoint of more excellent hardenability. Examples of the cyclic structure include an alicyclic hydrocarbon group, an aromatic hydrocarbon groups and a combination of thereof. $R^{31}$ may have an aliphatic hydrocarbon group, specifically a linear or branched aliphatic hydrocarbon group, in addition to the cyclic structure.

Specific examples of the alicyclic hydrocarbon group include cycloalkyl groups such as a cyclopropyl group, a cyclobutyl group, a cyclopentyl group, a cyclohexyl group, a cycloheptyl group and a cyclooctyl group; naphthene rings (cycloparaffin rings derived from naphthenic acid); and crosslinked-ring hydrocarbon groups such as an adamantyl group and a norbornyl group.

Examples of the aromatic hydrocarbon group include a phenyl group, a naphthyl group and an azulene group.

Examples of the aliphatic hydrocarbon group include a methyl group, an ethyl group, a propyl group, an isopropyl group, a butyl group, an isobutyl group, a pentyl group, a hexyl group, an octyl group, a 2-ethylhexyl group, a nonyl group, a decyl group and an undecyl group.

Especially, the hydrocarbon group denoted by $R^{31}$ is preferably the alicyclic hydrocarbon group and the aromatic hydrocarbon group, more preferably the cyclopropyl group, the cyclopentyl group, the cyclohexyl group, the adamantyl group, the naphthene ring (a naphthoate group as $R^{31}COO-$) and the phenyl group, particularly preferably the cyclopropyl group, the cyclopentyl group, the cyclohexyl group, the adamantyl group and the naphthene ring, from the viewpoint of more excellent hardenability Preferably, the number of carbon atoms of the hydrocarbon group denoted by $R^{32}$ is 3 to 8 from the viewpoint of excellent thermal stability and excellent compatibility.

Examples of the hydrocarbon group denoted by $R^{32}$ include an aliphatic hydrocarbon group, an alicyclic hydrocarbon group, an aromatic hydrocarbon groups and a combination thereof. The hydrocarbon group may be linear or branched. The hydrocarbon group may have an unsaturated bond. The hydrocarbon group may have a hetero atom such as an oxygen atom, a nitrogen atom and a sulfur atom. The hydrocarbon group denoted by $R^{32}$ is preferably the aliphatic hydrocarbon group, from the viewpoint of excellent thermal stability and excellent compatibility.

Examples of the organo-oxy-zirconium compound include zirconium trialkoxy mononaphthoate, zirconium trialkoxy monocyclopropane carboxylate, zirconium trialkoxy cyclobutane carboxylate, zirconium trialkoxy monocyclopentane carboxylate, zirconium trialkoxy monocyclohexane carboxylate and zirconium trialkoxy monoadamantane carboxylate.

The zirconium compound includes, for example, a reaction product between an organo-oxy-zirconium compound and another metal catalyst (for example, a zinc carboxylate salt).

The preparation of the zirconium compound is not particularly limited. For example, a conventionally known preparation can be used.

The amount of the condensation catalyst is preferably 0.01 to 5 parts by weight, more preferably 0.02 to 3 parts by weight, particularly preferably 0.05 to 2 parts by weight, based on 100 parts by weight of the polyether polymer (A), from the viewpoint that higher hardness, more excellent hardenability and higher transparency.

When the condensation catalyst comprises both of the tin compound and the zinc compound, the amounts of the tin compound and the zinc compound are such that the amount of the zinc compound is preferably 2 to 50 parts by weight, more preferably 5 to 30 parts by weight, based on 100 parts by weight of the tin compound, from the viewpoint of higher hardness, more excellent hardenability and higher transparency.

When the condensation catalyst comprises the tin compound, the zinc compound and the zirconium compound, the amounts of the tin compound, the zinc compound and the zirconium compound are such that the zinc compound is preferably 2 to 50 parts by weight, more preferably 5 to 30 parts by weight, and the zirconium compound is 2 to 50 parts by weight, more preferably 5 to 30 parts by weight, based on 100 parts by weight of the tin compound, from the viewpoint of higher hardness, more excellent hardenability and higher transparency.

When a plurality of condensation catalysts is used together, the adhesive may contain the condensation catalysts by separately using each of the condensation catalysts. It is possible to use a product obtained by heating beforehand to react a plurality of condensation catalysts.

The adhesive may further contain an additive, if necessary, in addition to the above-mentioned components. Examples of the additive include an inorganic filler, an antioxidant, a lubricant, an ultraviolet ray absorbent, a thermal and light stabilizer, a dispersant, an antistatic agent, a polymerization inhibitor, a defoaming agent, a hardening accelerator, a solvent, an inorganic fluorescent substance, an age resistor, a radical inhibitor, an adhesion-improving agent, a flame retardant, a surface active agent, a storage stability-improving agent, an antiozonant, a thickener, a plasticizer, a radiation blocker, a nucleating agent, a coupling agent, an electrically conductive agent, a phosphorus-containing peroxide decomposition agent, a pigment, a metal deactivator and a physical property modifier. The additive is not particularly limited. For example, conventionally known additives can be used.

The amount of the additive may be 0 to 20 parts by weight, for example, 0.1 to 10 parts by weight, based on 100 parts by weight of the polyether polymer (A).

(D) Antioxidant

The electrically conductive adhesive may contain the antioxidant. The antioxidant is used to prevent oxidation of the electrically conductive adhesive, whereby improving weatherability. Examples of the antioxidant include a hindered amine antioxidant and a hindered phenol antioxidant.

Examples of the hindered amine antioxidant include N,N', N'',N'''-tetrakis(4,6-bis(butyl-(N-methyl-2,2,6,6-tetramethylpiperidin-4-yl)amino)-triazin-2-yl)-4,7-diazadecane-1,10-diamine, a polycondensate of dibutylamine/1,3,5-triazine/N, N'-bis(2,2,6,6-tetramethyl-4-piperidyl-1,6-hexamethylenediamine/N-(2,2,6,6-tetramethyl-4-piperidyl) butylamine, poly[{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}], a polymer of dimethyl succinate and 4-hydroxy-2, 2,6,6-tetramethyl-1-piperidinethanol, [a reaction product of bis(2,2,6,6-tetramethyl-1-(octyloxy)-4-piperidyl) decanedioic ester, 1,1-dimethylethylhydroperoxide and octane] (70%)/polypropylene (30%), bis(1,2,2,6,6-pentamethyl-4-piperidyl)[[3,5-bis(1,1-dimethylethyl)-4-hydroxyphenyl] methyl]butylmalonate, methyl 1,2,2,6,6-pentamethyl-4-piperidyl sebacate, bis(2,2,6,6-tetramethyl-4-piperidyl) sebacate, bis(1,2,2,6,6-pentamethyl-4-piperidyl) sebacate, 1-[2-[3-(3,5-di-tert-butyl-4-hydroxy-phenyl)propionyloxy] ethyl]-4-[3-(3,5-di-tert-butyl-4-hydroxyphenyl)propionyloxy]-2,2,6,6-tetramethylpiperidine, 4-benzoyloxy-2,2,6,6-tetramethyl piperidine, and 8-acetyl-3-dodecyl-7,7,9,9-tetramethyl-1,3,8-triazaspiro[4.5]decan-2,4-dione, but are not limited to these.

Examples of the hindered phenol antioxidant include pentaerythritol-tetrakis[3-(3,5-di-tert-butyl-4-hydroxyphenyl)propionate], thiodiethylene-bis[3-(3,5-di-tert-butyl-4-hydroxyphenyl)propionate], octadecyl-3-(3,5-di-tert-butyl-4-hydroxyphenyl)propionate), N,N'-hexane-1,6-diylbis[3-(3,5-di-tert-butyl-4-hydroxyphenylpropioamide), benzenepropanoic acid 3,5-bis(1,1-dimethylethyl)-4-hydroxy $C_7$-$C_9$ side chain alkyl ester, 2,4-dimethyl-6-(1-methylpentadecyl)phenol, diethyl[[3,5-bis-(1,1-dimethylethyl)-4-hydroxyphenyl]methyl]phosphonate, 3,3',3'',5,5',5''-hexane-tert-butyl-4-a,a',a''-(mesitylene-2,4,6-tolyl)tri-p-cresol, calcium diethylbis[[[3,5-bis-(1,1-dimethylethyl)-4-hydroxyphenyl] methyl]phosphonate], 4,6-bis (octylthiomethyl)-o-cresol, ethylenebis-(oxyethylene)bis[3-(5-tert-butyl-4-hydroxy-m-tolyl)propionate], hexamethylenebis[3-(3,5-di-tert-butyl-4-hydroxyphenyl) propionate], 1,3,5-tris(3,5-di-tert-butyl-4-hydroxybenzyl)-1,3,5-triazine-2,4,6-(1H, 3H, 5H)-trione, a reaction product of N-phenylbenzeneamine and 2,4,4-trimethylpentene, and 2,6-di-tert-butyl-4-(4,6-bis(octylthio)-1,3,5-triazine-2-ylamino)phenol, but are not limited to these. The above-mentioned antioxidant may be used alone or in combination of at least two.

The amount of the antioxidant (D) may be 3 parts by weight or less, for example, 0 to 2 parts by weight, particularly 0 to 0.5 parts by weight, especially 0 parts by weight, based on 100 parts by weight of the polyether polymer (A). Preferably, the electrically conductive adhesive does not substantially contain the antioxidant (D), which means that the amount of the antioxidant (D) is 0 to 0.5 parts by weight, especially 0 parts by weight, based on 100 parts by weight of the polyether polymer (A). More preferably, the electrically conductive adhesive does not contain the antioxidant (D). Such amount of the antioxidant gives a low electric resistance after hardening of the electrically conductive adhesive.

(E) Other Additive

Examples of the other additive include an organic solvent, a silane coupling agent, a plasticizer and an ultraviolet ray absorbent. The amount of the other additive may be 0 to 15 parts by weight, for example, 0.1 to 5 parts by weight, based on 100 parts by weight of the polyether polymer (A).

(E1) Organic Solvent

When the antioxidant (D) is a solid, the antioxidant (D) may be dissolved in the organic solvent to be added to the polyether polymer, in order to improve dispersibility, before mixing with the polyether polymer. Examples of the organic solvent includes an aromatic hydrocarbon (for example, toluene) and an alcohol (for example, methyl alcohol).

(E2) Silane Coupling Agent

The electrically conductive adhesive may comprise the silane coupling agent acting as an adhesion promoter. Examples of the silane coupling agent include amino silanes such as aminoethyl aminopropyl trimethoxysilane, aminoethyl aminopropyl methyl dimethoxysilane and aminoethyl aminopropyl methyl methoxysilane; epoxy silanes such as gamma-glycidoxypropyl trimethoxysilane; acrylic silanes such as gamma-methacryloxypropyl trimethoxysilane; mercapto silanes such as gamma-mercaptopropyl trimethoxysilane; and isocyanate silanes such as gamma-isocyanatopropyl trimethoxysilane. The above-mentioned silane coupling agent may be used alone or in a combination of at least two.

Method of Producing Electrically Conductive Adhesive

The electrically conductive adhesive can be produced by mixing the polymer (A), the silver particles (B), and, optionally other component(s). The mixing can be performed at a temperature of 0 to 50° C., for example, at a room temperature (25° C.). In the production of the electrically conductive adhesive, the degassing is preferably performed. The degassing can prevent the deterioration of strength caused by formation of air bubbles after hardening.

Method of Producing Electrically Conductive Material

One of embodiments of the present disclosure relates to a method of producing the electrically conductive material comprising the step (calcinating step) of hardening the electrically conductive adhesive. The electrically conductive material can be produced by a method comprising the step of calcinating the electrically conductive adhesive.

The calcination (hardening) may be performed under an atmosphere such as a non-oxidizing atmosphere, an air atmosphere, a vacuum atmosphere, an oxygen or mixed gas atmosphere, and an air-stream atmosphere. Preferably, the calcination is performed under the atmospheric air atmosphere. When the calcination is performed under this atmosphere, the calcination can handle a roll-to-roll step. In addition, when the silver particles are used as the metal particles, the thermal diffusion of silver is accelerated to give the electrically conductive material having a lower electric resistance.

Preferably, the calcination is performed at a temperature in the range of 120° C. to 300° C., preferably 150° C. to 250° C., for example, 160° C. to 220° C., particularly 175° C. to 195° C. The metal particles continue to sinter in this temperature range, without oxidation of a resin material (particularly the polyether polymer (A)). The time of the calcination may be 5 minutes to 48 hours, for example, 30 minutes to 120 minutes. The electrically conductive adhesive is preferably one which gives the electrically conductive material having a resistivity of 300 micro-ohm-cm or less, and an elastic modulus of 300 MPa or less, for example, by calcination in an atmospheric-air oven at 185° C. for 60 minutes. Such an electrically conductive adhesive has high reliability (for example, high flexibility) as well as low power consumption, in the flexible device.

Electrically Conductive Material

The electrically conductive material is a hardened material produced by hardening (calcinating) the electrically conductive adhesive. The electrically conductive material is a hardened material of the electrically conductive adhesive. Preferably, the metal particles in the electrically conductive material are sintered. Particularly when the metal particles are sintered, the electrically conductive material has the advantage that the electric resistance is low.

The electrically conductive material may have the resistivity of at most 300 micro-ohm-cm, preferably at most 200 micro-ohm-cm, more preferably at most 100 micro-ohm-cm. The lower the resistivity is, the loss of electric power is more suppressed, and the heat dissipation is more excellent, particularly when the electrically conductive material is used as an electrode.

The electrically conductive material may have an elastic modulus of 300 MPa or less, preferably 150 MPa or less. Particularly when the electrically conductive material is used as an electrode, the lower the elastic modulus is, the more excellent the flexibility is. Generally, the electrically conductive material is bonded to a substrate. Examples of the substrate include resins, plastics, ceramics, glass, metals, fabrics and paper. The electrically conductive material may be bonded to two substrates, or may be present on one substrate.

The electrically conductive material can be used as a wiring having good electrical conductivity. The electrically conductive material can be used in the electronic parts requiring flexibility, for example, light-emitting devices, such as a backlight module.

Hereinafter, the electrically conductive adhesive, the method of producing the electrically conductive adhesive, the electrically conductive material, and the method of producing the electrically conductive material according to the present embodiments are explained, with showing the following Examples and Comparative Examples.

EXAMPLES

In the following Examples and Comparative Examples, measurements are made as follows:

Measurement of Resistivity

An obtained electrically conductive adhesive was coated in a thickness of 100 micrometers on a glass substrate (having a thickness of 1 mm) by a screen printing. The glass substrate coated with the electrically conductive adhesive was heated under an air atmosphere for 60 minutes at a temperature specified as Table 1 and 2. A resistivity of an obtained wiring (electrically conductive material) was measured at the temperature of 25° C. by a four probe method using a resistivity meter MCP-T600 (manufactured by Mitsubishi Chemical, Inc.).

Measurement of Elastic Modulus

An obtained electrically conductive adhesive was hardened by using a metal mold coated with a fluororesin to give a plate having a thickness of 1 mm. The elastic modulus of the obtained plate (electrically conductive material) was measured by a viscoelasticity measurement apparatus DMS 6100 (manufactured by Seiko Instruments, Inc.). The measurement conditions were a chuck-to-chuck distance of 20 mm, a width of 10 mm, a temperature of 30° C., a frequency of 10 Hz and a tension gain of 1.0.

Example 1

A polymer (viscosity: 6 Pa-s) (KANEKA MS polymer) (SAX350 manufactured by Kaneka Corporation, polypropylene oxide) (1.59 g, 100 parts by weight) having repeating units: —$CH(CH_3)$—$CH_2$—O— in a backbone, and an end group: —$Si(-CH_3)(-OCH_3)_2$, as a polyether polymer (A), and flaky silver particles (trade name "AgC-239" manufactured by Fukuda Metal Foil & Powder, Co., Ltd.) (flake-shaped, an average particle diameter: 2.7 micrometers, a specific surface area: 0.7 $m^2/g$, a content of particles having a particle size of less than 0.3 micrometers: 1% by weight, and a content of particles having a particle size of not more than 0.5 micrometers: 3% by weight) (9.00 g, 566 parts by weight), as silver particles (B), were mixed by using a recipe of stirring for 1 minute and then defoaming for 15 seconds in a mixer to obtain an electrically conductive adhesive (silver particle content: 85.0% by weight).

Example 2

The same procedure as in Example 1 was repeated to obtain an electrically conductive adhesive (silver particle content: 84.7% by weight), except that dibutyltin dioctoate as a condensation catalyst (C) was additionally charged in the amount of 2 parts by weight (0.03 g), based on 100 parts by weight of the polyether polymer (A).

Example 3

The same procedure as in Example 2 was repeated to obtain an electrically conductive adhesive (silver particle content: 84.5% by weight) except that 3-aminopropyl trimethoxysilane (KBM-903, manufactured by Shin-Etsu Chemical Co., Ltd.) as a silane coupling agent was additionally charged in the amount of 2 parts by weight (0.03 g), based on 100 parts by weight of the polyether polymer (A).

Example 4

The same procedure as in Example 3 was repeated to obtain an electrically conductive adhesive (silver particle content: 83.1% by weight), except that a solution previously prepared by mixing a hindered phenol antioxidant (AO-60, manufactured by ADEKA Corporation) (4.00 g) as an antioxidant (D) with toluene (7.50 g) as an organic solvent was additionally charged (0.18 g as the solution), in the amounts of 4 parts by weight and 7.5 parts by weight, respectively, based on 100 parts by weight of the polyether polymer (A).

Example 5

The same procedure as in Example 1 was repeated to obtain an electrically conductive adhesive (silver particle content: 90.0% by weight), except that a polymer (viscosity 0.6 Pa-s) SAT010 (KANEKA MS polymer, polypropylene oxide) (1.00 g, 100 parts by weight) having repeating units of a backbone: —$CH(CH_3)$—$CH_2$—O— and an end group: —$Si$(—$CH_3$)(—$OCH_3$)$_2$ was used as a polyether polymer (A), and the amount of the silver particles (B) was changed to be 900 parts by weight (9.00 g), based on 100 parts by weight of the polyether polymer (A).

Example 6

The same procedure as in Example 5 was repeated to obtain an electrically conductive adhesive (silver particle content: 89.8% by weight), except that dibutyltin dioctoate as a condensation catalyst (C) was additionally charged in the amount of 2 parts by weight (0.02 g), based on 100 parts by weight of the polyether polymer (A).

Example 7

The same procedure as in Example 6 was repeated to obtain an electrically conductive adhesive (silver particle content: 89.6% by weight), except that 3-aminopropyl trimethoxysilane (KBM-903, manufactured by Shin-Etsu Chemical Co., Ltd.) as a silane coupling agent was additionally charged in the amount of 2 parts by weight (0.02 g), based on 100 parts by weight of the polyether polymer (A).

Example 8

The same procedure as in Example 7 was repeated to obtain an electrically conductive adhesive (silver particle content: 88.6% by weight), except that a solution previously prepared by mixing a hindered phenol antioxidant (AO-60, manufactured by ADEKA Corporation) (4.00 as an antioxidant (D) with toluene (7.50 as an organic solvent was additionally charged (0.12 g as the solution), in the amounts of 4 parts by weight and 7.5 parts by weight, respectively, based on 100 parts by weight of the polyether polymer (A).

Comparative Example 1

The same manner as in Example 1 was repeated to obtain an electrically conductive adhesive (silver particle content: 77.5% by weight), except that a polymer (viscosity 210 Pa-s) SA100S (XMAP manufactured by KANEKA, polyacrylate) (2.25 g) having a backbone of repeating units: —$CH(COOR)$—$CH_2$— and an end group: —$Si$(—$CH_3$)(—$OCH_3$)$_2$ was used instead of SAX350,
the amount of the silver particles (B) was 400 parts by weight (9.00 g), based on 100 parts by weight of the polyether polymer (A)
dibutyltin dioctoate as a condensation catalyst (C) was additionally charged in the amount of 2 parts by weight (0.05 g), based on 100 parts by weight of the polyether polymer (A),
3-aminopropyl trimethoxysilane (KBM-903, manufactured by Shin-Etsu Chemical Co., Ltd.) as a silane coupling agent was additionally charged in the amount of 2 parts by weight (0.05 g), based on 100 parts by weight of the polyether polymer (A), and
a solution previously prepared by mixing AO-60 (manufactured by ADEKA Corporation) (4.00 g) as an antioxidant (D) with toluene (7.50 g) as an organic solvent was additionally charged (0.26 g as the solution) in the amount of 4 parts by weight and 7.5 parts by weight, respectively, based on 100 parts by weight of the polyether polymer (A).

Comparative Example 2

The same procedure as in Example 1 was repeated to give an electrically conductive adhesive (silver particle content: 84.7% by weight), except that a condensed-type silicone resin TLG-E001 (manufactured by Sumitomo Chemical Co., Ltd.) (1.59 g) was used instead of SAX350, and TLG-X1 (manufactured by Sumitomo Chemical Co., Ltd.) as a condensation catalyst (C) was additionally charged in the amount of 2 parts by weight (0.03 g), based on 100 parts by weight of the polyether polymer (A).

Comparative Example 3

The same procedure as in Example 1 was repeated to give an electrically conductive adhesive (silver particle content: 84.6% by weight), except that a condensed-type silicone resin TLG-E001 (manufactured by Sumitomo Chemical Co., Ltd.) (1.59 g) was used instead of SAX350, and TLG-X1 (manufactured by Sumitomo Chemical Co., Ltd.) as a condensation catalyst (C) was additionally charged in the amount of 3 parts by weight (0.05 g), based on 100 parts by weight of the polyether polymer (A).

Comparative Example 4

Flaky silver particles (trade name "AgC-239" manufactured by Fukuda Metal Foil & Powder, Co., Ltd.) (flake-shaped, an average particle diameter: 2.7 micrometers, a specific surface area: 0.7 m$^2$/g, a content of particles having a particle size of less than 0.3 micrometers: 1% by weight, and a content of the particles having particle size of not more than 0.5 micrometers: 3% by weight) (9.19 g) as silver particles (B), 2-ethyl-1,3-hexanediol (0.574 g) and diethylene glycol monobutyl ether (0.144 g) as a solvent, and surface active agent, BEAULIGHT LCA-H (carboxylate-containing anionic surfactant) (manufactured by Sanyo Chemical Industries, Ltd.) (0.092 g) were mixed by using a recipe of stirring for 1 minute and then defoaming for 15 seconds in a mixer to obtain an electrically conductive adhesive (silver particle content: 91.9% by weight).

Example 9

The same procedure as in Example 3 was repeated to obtain an electrically conductive adhesive (silver particle content: 84.33% by weight), except that a solution previously prepared by mixing a hindered phenol antioxidant (AO-60, manufactured by ADEKA Corporation) (4.00 g) as an antioxidant (D) with toluene (7.50 g) as an organic solvent was additionally charged (0.02 g as the solution), in the amounts of 0.5 parts by weight and 0.9 parts by weight, respectively, based on 100 parts by weight of the polyether polymer (A).

Example 10

The same procedure as in Example 3 was repeated to obtain an electrically conductive adhesive (silver particle content: 84.15% by weight), except that a solution previously prepared by mixing a hindered phenol antioxidant (AO-60, manufactured by ADEKA Corporation) (4.00 g) as an antioxidant (D) with toluene (7.50 g) as an organic solvent was additionally charged (0.05 g as the solution), in the amounts of 1 part by weight and 1.9 parts by weight, respectively, based on 100 parts by weight of the polyether polymer (A).

Example 11

The same procedure as in Example 3 was repeated to obtain an electrically conductive adhesive (silver particle content: 83.79% by weight), except that a solution previously prepared by mixing a hindered phenol antioxidant (AO-60, manufactured by ADEKA Corporation) (4.00 g) as an antioxidant (D) with toluene (7.50 g) as an organic solvent was additionally charged (0.09 g as the solution), in the amounts of 2 parts by weight and 3.8 parts by weight, respectively, based on 100 parts by weight of the polyether polymer (A).

Example 12

The same procedure as in Example 3 was repeated to obtain an electrically conductive adhesive (silver particle content: 83.43% by weight), except that a solution previously prepared by mixing a hindered phenol antioxidant (AO-60, manufactured by ADEKA Corporation) (4.00 g) as an antioxidant (D) with toluene (7.50 g) as an organic solvent was additionally charged (0.14 g as the solution), in the amounts of 3 parts by weight and 5.6 parts by weight, respectively, based on 100 parts by weight of the polyether polymer (A).

Example 13

The same procedure as in Example 7 was repeated to obtain an electrically conductive adhesive (silver particle content: 89.51% by weight), except that a solution previously prepared by mixing a hindered phenol antioxidant (AO-60, manufactured by ADEKA Corporation) (4.00 g) as an antioxidant (D) with toluene (7.50 g) as an organic solvent was additionally charged (0.01 g as the solution), in the amounts of 0.5 parts by weight and 0.9 parts by weight, respectively, based on 100 parts by weight of the polyether polymer (A).

Example 14

The same procedure as in Example 7 was repeated to obtain an electrically conductive adhesive (silver particle content: 89.39% by weight), except that a solution previously prepared by mixing a hindered phenol antioxidant (AO-60, manufactured by ADEKA Corporation) (4.00 g) as an antioxidant (D) with toluene (7.50 g) as an organic solvent was additionally charged (0.03 g as the solution), in the amounts of 1 part by weight and 1.9 parts by weight, respectively, based on 100 parts by weight of the polyether polymer (A).

Example 15

The same procedure as in Example 7 was repeated to obtain an electrically conductive adhesive (silver particle content: 89.13% by weight), except that a solution previously prepared by mixing a hindered phenol antioxidant (AO-60, manufactured by ADEKA Corporation) (4.00 g) as an antioxidant (D) with toluene (7.50 g) as an organic solvent was additionally charged (0.06 g as the solution), in the amounts of 2 parts by weight and 3.8 parts by weight, respectively, based on 100 parts by weight of the polyether polymer (A).

Example 16

The same procedure as in Example 7 was repeated to obtain an electrically conductive adhesive (silver particle content: 88.88% by weight), except that a solution previously prepared by mixing a hindered phenol antioxidant (AO-60, manufactured by ADEKA Corporation) (4.00 g) as an antioxidant (D) with toluene (7.50 g) as an organic solvent was additionally charged (0.09 g as the solution), in the amounts of 3 parts by weight and 5.6 parts by weight, respectively, based on 100 parts by weight of the polyether polymer (A).

TABLE 1

| | | Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| Silver particles (B) | AgC-239 | 566 | 566 | 566 | 566 | 900 | 900 | 900 | 900 | 400 | 566 | 566 | 91.9 |
| Polyether polymer (A) | SAX350 | 100 | 100 | 100 | 100 | — | — | — | — | — | — | — | — |
| | SAT010 | — | — | — | — | 100 | 100 | 100 | 100 | — | — | — | — |
| | SA100S | — | — | — | — | — | — | — | — | 100 | — | — | — |
| | TLG-E001 | — | — | — | — | — | — | — | — | — | 100 | 100 | — |
| Condensation catalyst (C) | TLG-X1 | — | — | — | — | — | — | — | — | — | 2 | 3 | — |
| | Dibutyltin dioctoate | — | 2 | 2 | 2 | — | 2 | 2 | 2 | 2 | — | — | — |
| Silane coupling agent | KBM-903 | — | — | 2 | 2 | — | — | 2 | 2 | 2 | — | — | — |
| Antioxidant (D) | AO-60 | — | — | — | 4 | — | — | — | 4 | 4 | — | — | — |
| Organic solvent | Toluene | — | — | — | 7.5 | — | — | — | 7.5 | 7.5 | — | — | — |
| | 2-Ethyl-1,3-hexanediol | — | — | — | — | — | — | — | — | — | — | — | 5.74 |
| | Diethylene glycol monobutyl ether | — | — | — | — | — | — | — | — | — | — | — | 1.44 |

TABLE 1-continued

|  |  | Example |  |  |  |  |  |  |  | Comparative Example |  |  |  |
|---|---|---|---|---|---|---|---|---|---|---|---|---|---|
|  |  | 1 | 2 | 3 | 4 | 5 | 6 | 7 | 8 | 1 | 2 | 3 | 4 |
| Surface active agent | BEAULIGHT LCA-H | — | — | — | — | — | — | — | — | — | — | — | 0.92 |
| Resistivity (μΩ · cm) | 170° C. | 46 | 150 | 158 | >9999 | 30 | 1640 | 156 | 258 | — | — | — | — |
|  | 185° C. | 36 | 33 | 38 | 1199 | 18 | 27 | 20 | 121 | >9999 | 2204 | 272 | 4 |
|  | 200° C. | 55 | 147 | 216 | 40 | 33 | 35 | 40 | 133 | >9999 | >9999 | 63 | — |
| Elastic modulus (MPa) |  | 109 | — | — | 10 | — | 47 | 84 | 78 | — | — | — | 11000 |

TABLE 2

|  |  | Ex. 3 | Ex. 9 | Ex. 10 | Ex. 11 | Ex. 12 | Ex. 4 | Ex. 7 | Ex. 13 | Ex. 14 | Ex. 15 | Ex. 16 | Ex. 8 |
|---|---|---|---|---|---|---|---|---|---|---|---|---|---|
| Silver particles (B) | AgC-239 | 566 | 566 | 566 | 566 | 566 | 566 | 900 | 900 | 900 | 900 | 900 | 900 |
| Polyether polymer (A) | SAX350 | 100 | 100 | 100 | 100 | 100 | 100 | — | — | — | — | — | — |
|  | SAT010 | — | — | — | — | — | — | 100 | 100 | 100 | 100 | 100 | 100 |
| Condensation catalyst (C) | Organic tin-based compound | 2 | 2 | 2 | 2 | 2 | 2 | 2 | 2 | 2 | 2 | 2 | 2 |
| Silane coupling agent | KBM-903 | 2 | 2 | 2 | 2 | 2 | 2 | 2 | 2 | 2 | 2 | 2 | 2 |
| Antioxidant (D) | AO-60 | — | 0.5 | 1 | 2 | 3 | 4 | — | 0.5 | 1 | 2 | 3 | 4 |
| Organic solvent | Toluene | — | 0.9 | 1.9 | 3.8 | 5.6 | 7.5 | — | 0.9 | 1.9 | 3.8 | 5.6 | 7.5 |
| Resistivity (μΩ · cm) | 185° C. | 38 | 38 | 57 | 55 | 545 | 1199 | 20 | 23 | 28 | 51 | 78 | 121 |

Tables 1 and 2 show ingredient amounts and the test results of resistivity and elastic modulus in Examples 1 to 16 and Comparative Examples 1 to 4. As shown in Table 1, Comparative Example 4 consisting of the silver particles (B) and a solvent component has a large elastic modulus which is larger than 1 GPa, but each of the adhesives comprising KANEKA MS polymer has a small elastic modulus which is 150 MPa or less.

As to the electric resistance, in the adhesive comprising KANEKA MS polymer, the resistivity for 185° C. was smaller than the resistivities for 170° C. and 200° C., as shown in Table 1. It is seems that the calcination in the presence of oxygen can lower a sintering temperature of the silver particles (B), and that the higher the calcination temperature is, the more the sintering is promoted. On the other hand, the higher the calcination temperature is, the larger amount of oxygen is consumed by the oxidative degradation of the resin material (polyether polymer), which gives lack in oxygen required for sintering of the silver particles. It seems that a suitable range for the calcination temperature is present.

Further, when the presence and absence of the antioxidant (D) are compared, as long as the results of 185° C. between Examples 3 and 4 and between Examples 7 and 8 are considered, the addition of the antioxidant worsens the electric resistance. It seems that oxygen lowering the sintering temperature of the silver particles is lack because of the antioxidant, as mentioned above. Table 2 shows the results for various addition ratios of the antioxidant, and reveals the deterioration of the electric resistance depending on the addition ratios. In order to obtain the resistivity of at most 100 micro-ohm-cm, the amount of the antioxidant (D) is preferably at most 3 parts by weight, based on 100 parts by weight of the polyether polymer (A), as shown in the results of Example 16. More preferably, the amount of the antioxidant (D) is at most 0.5 parts by weight, particularly 0 parts by weight, which gives no adverse influence on the properties.

A polyether having a hydrolyzable silicon group, as represented by KANEKA MS polymer, has comparatively good oxygen permeability in view of possession of a siloxane bond. In the polyether such as KANEKA MS polymer, a siloxane bond easily decomposes, the contact of the silver particles easily occurs at the time of heating, and the polymer structurally has high flexibility. For the above-mentioned reasons, the excellent characteristics including the elastic modulus of at most 150 MPa and the resistivity of at most 100 micro-ohm-cm were obtained at the low temperature of 185° C.

By using a commercially available silicone silver paste (trade name "TB3303B", manufactured by Three Bond Co., Ltd.) and the electrically conductive adhesive of Example 7, the electrically conductive adhesive was applied by a screen printing method and hardened to make a direct connect to five LED chips embedded into the resin substrate containing a fluorescent substance. Table 3 shows, at each of electric current values, a drive voltage and a power consumption determined by multiplying the electric current value by the drive voltage.

TABLE 3

|  |  | Electric current value (mA) | | | | | |
|---|---|---|---|---|---|---|---|
|  |  | 0.5 | 1 | 3 | 5 | 7 | 10 |
| Drive voltage (V) | TB3303B | 12.37 | 12.51 | 12.77 | 13.01 | 13.17 | 13.43 |
|  | Example 7 | 12.34 | 12.44 | 12.62 | 12.71 | 12.77 | 12.86 |

TABLE 3-continued

| | | \multicolumn{6}{c}{Electric current value (mA)} | | | | | |
|---|---|---|---|---|---|---|---|
| | | 0.5 | 1 | 3 | 5 | 7 | 10 |
| Power consumption (mW) | TB3303B | 6.2 | 12.5 | 38.3 | 65.1 | 92.2 | 134.3 |
| | Example 7 | 6.2 | 12.4 | 37.9 | 63.5 | 89.4 | 128.6 |
| Reduction of power consumption (%) | | 0.3 | 0.5 | 1.2 | 2.3 | 3.0 | 4.2 |

Table 3 shows that the electrically conductive adhesive of Example 7 had the low electric resistance, which is lower than the electric resistance of the existing silicone silver paste, to reduce the power consumption.

The electrically conductive adhesive of the present embodiment can be used in preparation uses, such as an electrode for flexible substrates, a die attach, a fine bump, a flat panel, and a solar wiring, in uses, such as a wafer connection, and in the preparation of electronic parts produced by combining these. The production method of the electrically conductive material of the present embodiment can be used, for example, when producing a light-emitting device comprising a light-emitting element, such as LED and LD.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the fore going detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. An electrically conductive adhesive, which hardens at 160° C. to 250° C. to give an electrical conducting material connecting an electronic part to a conductor of a printed circuit board, said electrically conductive adhesive comprising:
   (A) a polyether polymer having:
      a backbone comprising a repeating unit of the formula:
         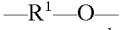
         wherein $R^1$ is a hydrocarbon group having 1 to 10 carbon atoms, and
      an end group which is a hydrolyzable silyl group of the formula:

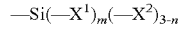

wherein
      $X^1$ is a hydrolysable group which is at least one group selected from a hydride group, an alkoxy group, a halogen group, an acyloxy group, a ketoxymate group, an aminoxy group, an amide group, an amino group and a mercapto group,
      $X^2$ a hydrocarbon group having 1 to 12 carbon atoms and n is 1, 2 or 3; and
   (B) metal particles comprising silver particles, wherein the metal particles comprising the silver particles have
      an average particle diameter of 1.0 micrometers to 10 micrometers,
      a content of metal particles having an average particle diameter of at most 0.3 micrometers of 5% by weight or less,
      a content of the silver particles of 88.6% to 98% by weight, based on the electrically conductive adhesive, and a content of silver particles of at least 90% by weight, based on the metal particles, and wherein the electrically conductive adhesive is mixable at 50° C.

2. The electrically conductive adhesive according to claim 1, wherein
the amount of the polyether polymer (A) is 1 to 30 parts by weight, based on 100 parts by weight of the silver particles (B).

3. The electrically conductive adhesive according to claim 1, wherein the metal particles further optionally comprise particles of another metal that is not silver, which is at least one selected from gold, copper, platinum, palladium, rhodium, ruthenium, iridium and osmium, and the amount of the particles of another metal is 30% to 0% by weight, based on the total of the silver particles (B) and the particles of another metal.

4. The electrically conductive adhesive according to claim 1, wherein the metal particles (B) are flake-shaped particles.

5. The electrically conductive adhesive according to claim 1, wherein the average particle diameter (median diameter) of the metal particles (B) is from 0.3 micrometers to 5 micrometers.

6. The electrically conductive adhesive according to claim 1, wherein the content of the metal particles (B) is 80% to 95% by weight, based on the electrically conductive adhesive.

7. The electrically conductive adhesive according to claim 1, which further comprises (C) a condensation catalyst.

8. The electrically conductive adhesive according to claim 7, wherein the condensation catalyst (C) is a tin compound.

9. The electrically conductive adhesive according to claim 1, which comprises (D) an antioxidant in the amount of 3 parts by weight or less, based on 100 parts by weight of the polyether polymer (A).

10. The electrically conductive adhesive according to claim 9, wherein the antioxidant (D) is a phenol antioxidant.

11. A method of producing an electrically conductive adhesive according to claim 1, wherein the method comprises mixing the silver particles (B) with the polyether polymer (A).

12. A method of producing an electrically conductive material, comprising hardening the electrically conductive adhesive according to claim 1, wherein the hardening is performed at 160° C. to 250° C. in the air for 30 to 120 minutes.

13. An electrically conductive material which is a hardened product of the electrically conductive adhesive according to claim 1.

14. A backlight module comprising a wiring which comprises the electrically conductive material according to claim 13.

15. The electrically conductive material according to claim 13, which has:
(i) a resistivity of 300 micro-ohm-cm or less, as measured by a method wherein the electrically conductive adhesive is coated in a thickness of 100 micrometers on a glass substrate having a thickness of 1 mm by a screen printing, the glass substrate coated with the electrically conductive adhesive is heated under an air atmosphere for 60 minutes at a temperature of 170° C., 180° C., or 200° C., and the resistivity of an obtained wiring of the electrically conductive material is measured at a temperature of 25° C. by a four probe method using a resistivity meter, and
(ii) an elastic modulus of 300 MPa or less, as measured by a method of measuring the elastic modulus of a plate of the electrically conductive material having a thickness of 1 mm by a viscoelasticity measurement apparatus in the measurement conditions of a chuck-to-chuck distance of 20 mm, a width of 10 mm, a temperature of 30° C., a frequency of 10 Hz, and a tension gain of 1.0.

16. A method of connecting an electronic part to a conductor of a printed circuit board, comprising:
connecting the electronic part to the conductor of the printed circuit board by the electrically conductive adhesive according to claim 1.

17. The electrically conductive adhesive according to claim 1, which hardens at 160° C. to 250° C. for 30 to 120 minutes.

18. The electrically conductive adhesive according to claim 1, wherein the metal particles have a specific surface area of 0.4 $m^2$/g to 1.5 $m^2$/g.

\* \* \* \* \*